United States Patent
Teraoka

[11] Patent Number: 5,904,634
[45] Date of Patent: May 18, 1999

[54] DIFFERENTIAL APPARATUS WITH ADDITIONAL SPEED INCREASING GEAR AND SPEED DECREASING GEAR SELECTIVELY ENGAGEABLE WITH A SINGLE OUTPUT SHAFT

[75] Inventor: Masao Teraoka, Tochigi-ken, Japan

[73] Assignee: Tochigi Fuji Sangyo Kabushiki Kaisha, Japan

[21] Appl. No.: 08/955,070

[22] Filed: Oct. 21, 1997

[30] Foreign Application Priority Data

Oct. 30, 1996 [JP] Japan .................................. 8-288170

[51] Int. Cl.$^6$ ....................................................... F16H 1/44
[52] U.S. Cl. ............................ 475/231; 475/18; 475/225; 475/204; 475/207
[58] Field of Search ................................ 475/18, 21, 207, 475/198, 204, 219, 231, 225, 84, 86

[56] References Cited

U.S. PATENT DOCUMENTS

| | | |
|---|---|---|
| 1,389,580 | 9/1921 | Davis . |
| 1,389,720 | 9/1921 | Ward . |
| 1,499,763 | 7/1924 | Davis . |
| 1,938,457 | 12/1933 | McCaffery .......................... 475/231 X |
| 2,269,734 | 1/1942 | Powell . |
| 2,791,919 | 5/1957 | Wildhaber . |
| 2,869,399 | 1/1959 | Miles . |
| 3,021,731 | 2/1962 | Stoeckicht et al. . |
| 3,071,314 | 1/1963 | Flanagan . |
| 3,251,244 | 5/1966 | Nickell . |
| 3,412,632 | 11/1968 | McFiggans . |
| 3,528,323 | 9/1970 | Kamlukin . |
| 3,706,239 | 12/1972 | Myers . |
| 3,768,336 | 10/1973 | Wharton . |
| 4,280,375 | 7/1981 | Goscenski, Jr. .......................... 475/231 |
| 4,365,524 | 12/1982 | Dissett . |
| 4,677,876 | 7/1987 | Dissett . |
| 4,776,234 | 10/1988 | Shea . |
| 4,777,838 | 10/1988 | Aarestad . |
| 4,781,078 | 11/1988 | Blessing et al. . |
| 4,838,118 | 6/1989 | Binkley . |
| 4,954,122 | 9/1990 | Nakao et al. . |
| 4,973,296 | 11/1990 | Shibahata ............................... 475/231 |
| 5,019,021 | 5/1991 | Janson . |

(List continued on next page.)

FOREIGN PATENT DOCUMENTS

| | | |
|---|---|---|
| 130806 | 6/1987 | European Pat. Off. . |
| 1105103 | 11/1955 | France . |
| 2126823 | 10/1972 | France . |
| 2553169 | 4/1985 | France . |
| 369548 | 2/1923 | Germany . |
| 1086136 | 1/1961 | Germany . |
| 1164187 | 2/1964 | Germany . |
| 2305306 | 8/1974 | Germany . |
| 2848206 | 5/1980 | Germany . |
| 3931745 | 3/1991 | Germany . |
| 4013196 | 10/1991 | Germany . |
| 4013202 | 10/1991 | Germany . |
| 4017800 | 12/1991 | Germany . |
| 4027368 | 3/1992 | Germany . |
| 4137931 | 5/1992 | Germany . |
| 4223374 | 1/1994 | Germany . |

(List continued on next page.)

*Primary Examiner*—Charles A. Marmor
*Assistant Examiner*—Ankur Parekh
*Attorney, Agent, or Firm*—Graham & James LLP

[57] ABSTRACT

A differential apparatus comprises: a differential gear (1) rotatably housed in a left end within a carrier case (3); a speed increasing mechanism and reducing mechanism (31) housed within the carrier case (3) in such a manner as to be adjacent to the rear differential apparatus (1), having a speed increasing mechanism (37) for increasing a rotational speed and a speed reducing mechanism (39) for reducing the rotational speed of the input gear (33) connected to a differential case (11) in a parallel manner; a speed increasing and reducing clutches (53) mounted to the carrier case (3) and for connecting and disconnecting the rotation from the input gear (33) which are arranged in a plane crossing to axes of output shafts (21,23) in parallel.

9 Claims, 3 Drawing Sheets

U.S. PATENT DOCUMENTS

| | | |
|---|---|---|
| 5,021,038 | 6/1991 | Beigang . |
| 5,030,181 | 7/1991 | Keller . |
| 5,078,660 | 1/1992 | Williams et al. . |
| 5,083,987 | 1/1992 | Korner et al. . |
| 5,102,378 | 4/1992 | Gobert . |
| 5,108,353 | 4/1992 | Brewer . |
| 5,122,101 | 6/1992 | Tseng . |
| 5,139,467 | 8/1992 | Carpenter . |
| 5,146,801 | 9/1992 | Oda . |
| 5,147,252 | 9/1992 | Mace et al. . |
| 5,156,578 | 10/1992 | Hirota . |
| 5,169,370 | 12/1992 | Dye et al. . |
| 5,194,058 | 3/1993 | Amborn et al. . |
| 5,209,707 | 5/1993 | Teraoka . |
| 5,242,336 | 9/1993 | Hori . |
| 5,269,730 | 12/1993 | Hirota . |
| 5,269,732 | 12/1993 | Weiss et al. . |
| 5,282,775 | 2/1994 | Teraoka . |
| 5,295,923 | 3/1994 | Takefuta . |
| 5,310,389 | 5/1994 | Sato . |
| 5,326,333 | 7/1994 | Niizawa . |
| 5,366,421 | 11/1994 | Hirota . |
| 5,370,588 | 12/1994 | Sawase et al. ............................. 475/84 |
| 5,385,514 | 1/1995 | Dawe . |
| 5,389,048 | 2/1995 | Carlson . |
| 5,415,601 | 5/1995 | Cilano . |
| 5,437,583 | 8/1995 | Shibahata et al. .................... 475/84 X |
| 5,441,461 | 8/1995 | Teraoka . |
| 5,458,546 | 10/1995 | Teraoka . |
| 5,458,547 | 10/1995 | Teraoka et al. . |
| 5,507,703 | 4/1996 | Madsack et al. . |
| 5,556,351 | 9/1996 | Hiraishi et al. . |
| 5,562,562 | 10/1996 | Teraoka . |
| 5,580,326 | 12/1996 | Teraoka . |
| 5,620,389 | 4/1997 | Sato . |
| 5,713,812 | 2/1998 | Hiraishi et al. . |
| 5,728,024 | 3/1998 | Ishizuka et al. . |

FOREIGN PATENT DOCUMENTS

| | | |
|---|---|---|
| 51-144637 | 11/1976 | Japan . |
| 54-54765 | 4/1979 | Japan . |
| 54-69257 | 5/1979 | Japan . |
| 55-3058 | 1/1980 | Japan . |
| 55-64550 | 5/1980 | Japan . |
| 59-97346 | 6/1984 | Japan . |
| 59-141254 | 9/1984 | Japan . |
| 60-81275 | 6/1985 | Japan . |
| 62-200071 | 9/1987 | Japan . |
| 2010145 | 3/1994 | Russian Federation . |
| 1421-933 | 9/1988 | U.S.S.R. . |
| 1442-772 | 12/1988 | U.S.S.R. . |
| 917132 | 1/1963 | United Kingdom . |
| 1136959 | 12/1968 | United Kingdom . |
| 1142960 | 2/1969 | United Kingdom . |
| 1256990 | 11/1970 | United Kingdom . |
| WO 85/04936 | 11/1985 | WIPO . |
| WO 86/02420 | 4/1986 | WIPO . |

DIFFERENTIAL APPARATUS WITH ADDITIONAL SPEED INCREASING GEAR AND SPEED DECREASING GEAR SELECTIVELY ENGAGEABLE WITH A SINGLE OUTPUT SHAFT

BACKGROUND OF THE INVENTION

1. Field of the Invention

The present invention relates to a differential apparatus for a vehicle, particularly to a control mechanism for distributing a driving force thereof.

2. Description of the Related Art

A differential apparatus in the related art is disclosed in Japanese Patent Application Laid Open No. 8-40103, for example.

In a rear differential apparatus of a four wheel drive vehicle in accordance with the above related art, a driving force from an engine is input to a ring gear fixed to a differential case via a drive pinion. Right and left side gears of a bevel gear differential mechanism are respectively connected to right and left output shafts, an input gear of a control mechanism is connected to the differential case and the input gear is meshed with a first pinion gear. The first pinion gear is integrally formed with adjacent second and third pinion gears, which are respectively meshed with a first and second sun gears. The first sun gear at a speed increasing end and the second sun gear at a speed reducing end are respectively input to torque capacity variable couplings and are transmitted to a right output shaft via the respective couplings integrally formed. At this time, a friction torque due to an operation of the coupling is reversely transmitted to the differential case through the first sun gear, the second pinion gear, the first pinion gear and the input gear, or via the second sun gear, the third pinion gear, the first pinion gear and the input gear. Thus the distribution of the driving force between the right and left output shafts is controlled by the fact that any one of the increased or reduced couplings becomes in a driving force transmitting state.

On the other hand, a differential apparatus disclosed in Japanese Patent Application Laid Open No. 8-21492 as another related art is a front differential apparatus of a front wheel drive vehicle for controlling a distribution of a driving force between right and left output shafts, as in a similar manner as the above. In this front differential apparatus, a driving force from an engine is input to a ring gear of a planetary gear front differential apparatus of a double pinion meshed with an input gear. Then the driving force is output to a right output shaft via two rows of pinion gears meshed with a second gear fixed to a left output shaft, a first sun gear and a pinion carrier.

The second sun gear and a ring gear of a planetary gear mechanism of a double pinion disposed leftward are fixed to the left output shaft connected to a sun gear of a differential mechanism. A speed reducing clutch for directly reducing a rotational speed of a carrier member is disposed in the carrier member supporting the pinion gear meshed with the second sun gear, and a speed increasing clutch for increasing speed through the planetary gear mechanism is disposed.

However, there is a problem that a axial space becomes large since the former rear differential apparatus is provided with three rows of pinion gears in the control mechanism and the latter front differential apparatus is provided with three rows of gears comprising the first and second sun gears and the planetary gear mechanism.

SUMMARY OF THE INVENTION

The present invention has been achieved with such points in mind.

It therefore is an object of the present invention to provide a differential apparatus capable of controlling a distribution of a driving force without enlarging an axial space thereof.

To achieve the object, according to a first aspect of the present invention, there is provided a differential apparatus comprising: a carrier case; a differential gear mechanism rotatably mounted in the carrier case, the differential gear mechanism having a driving member rotatably driven by driving force from an engine, the differential gear mechanism further having a first and a second output shafts distributing the driving force from the engine to wheels; a speed increasing and reducing mechanism mounted in the carrier case adjacent to the differential gear mechanism, the speed increasing and reducing mechanism having a input gear connected to the driving member, the speed increasing and reducing mechanism further having a speed increasing unit increasing a rotational speed from the input gear and a speed reducing unit reducing the rotational speed from the input gear, the speed increasing unit and the speed reducing unit arranged in a plane crossing to axes of the first and second output shafts in parallel; a speed increasing clutch mounted to the carrier case, the speed increasing clutch connecting and disconnecting the rotation from the input gear to the second output shaft, the speed increasing clutch having an actuator intermittently operating the speed increasing clutch; and a speed reducing clutch mounted to the carrier case, the speed reducing clutch connecting and disconnecting the rotation from the input gear to the second output shaft, the speed reducing clutch having an actuator intermittently operating the speed reducing clutch; wherein the speed increasing clutch and the speed reducing clutch are arranged in a plane crossing to the axes of the first and second output shafts in parallel.

In accordance with the invention as recited in the first aspect, since the speed increasing unit and the speed reducing unit are arranged in the plane crossing or perpendicular to the axes of the first and the second output shafts and the speed increasing clutch and the speed reducing clutch are also arranged in the other plane crossing or perpendicular to the axes, a size of the differential apparatus according to the present invention can be restricted to a small size with being different from the structure of the gear disposition comprising three rows in the above related art. Furthermore, a light weight of the apparatus according to the present invention can be obtained.

According to a second aspect of the present invention, as it depends from the first aspect, the speed increasing clutch and the speed reducing clutch are controllable multiple disk clutches; and the speed increasing clutch and the speed reducing clutch varies and transmits substantially continuously torque from the speed increasing and reducing mechanism to the second output shaft.

Since the pressing force of the respective actuators can be continuously controlled, the transmitting torque of the speed increasing clutch and the speed reducing clutch can also continuously controlled as varying the transmitting torque.

In other wards, the speed increasing and reducing mechanism and the speed increasing clutch and the speed reducing clutch are constituted by two row disposition, so that an axial length of a differential apparatus together with the speed increasing and reducing mechanism can be restricted to a small size with being different from the structure of the gear disposition comprising three rows in the above related art, and a light weight of the apparatus can be obtained.

Accordingly, since the transmission torque can be continuously adjusted by the speed increasing clutch and the speed reducing clutch, the distribution of the driving force to each of the first and the second output shafts can also be continuously and finely adjusted.

According to a third aspect of the present invention, as it depends from the first aspect or the second aspect, the speed increasing clutch and the speed reducing clutch are constituted as units being capable of attaching to the carrier case.

Each of the speed increasing clutch and the speed reducing clutch is constituted as a clutch unit, so that, assembling the clutch and maintenance thereafter can be easily performed and the radial size of the carrier case can be limited to a small size due to freedom of selecting the position for assembling.

According to a fourth aspect of the present invention, as it depends from any one aspect among the first aspect to the third aspect, the second output shaft is disposed to extent through a hollow axial center portion of the input gear of the speed increasing and reducing mechanism.

According to a fifth aspect of the present invention, as it depends from any one aspect among the first aspect to the fourth aspect, the speed increasing and reducing mechanism further has a transmitting gear connected to the second output shaft; the speed increasing unit of the speed increasing and reducing mechanism has an input end gear meshing with the input gear and an output end gear meshing with the transmitting gear, the input end gear and the output end gear are formed with different number of teeth from each other by profile shifter gear cutting, a distance between a center of the input gear and a center of the input end gear equals to a distance between a center of the transmitting gear and a center of the output end gear; and the speed reducing unit of the speed increasing and reducing mechanism has an input end gear meshing with the input gear and an output end gear meshing with the transmitting gear, the input end gear and the output end gear are formed with different number of teeth from each other by profile shifter gear cutting, a distance between a center of the input gear and a center of the input end gear equals to a distance between a center of the transmitting gear and a center of the output end gear.

According to a sixth aspect of the present invention, as it depends from any one aspect among the first aspect to the fifth aspect, the driving member is a differential case of the differential gear mechanism.

According to a seventh fifth aspect of the present invention, as it depends from any one aspect among the first aspect to the sixth aspect, the differential gear mechanism is constructed by a planetary gearing.

According to an eighth aspect of the present invention, as it depends from the seventh aspect, the planetary gearing of the differential gear mechanism is constructed by an internal gear rotated by the driving force from the engine, a sun gear connected to the second output shaft and a planetary gear meshing with the internal gear and the sun gear, the planetary gear is rotatably supported by a carrier; and the driving member is the carrier connected to the first output shaft.

According to a ninth aspect of the present invention, as it depends from the eighth aspect, the carrier has a follow boss portion formed to extent toward the second output shaft side in parallel with the second output shaft; and the carrier is connected to the input gear of the speed increasing and reducing mechanism through the follow boss portion of the carrier.

Therefore, according to the present invention, the size of the differential apparatus can be restricted to a small size, and the light weight of the apparatus can be obtained.

Further, since the transmission torque can be continuously adjusted by the speed increasing clutch and the speed reducing clutch, the distribution of the driving force to each of the first and the second output shafts can also be continuously and finely adjusted.

In addition, since the differential gear mechanism is constructed by the planetary gearing, the driving force or the torque which the second output shaft is received from the speed increasing clutch and the speed reducing clutch is directly transferred to the first output shaft. In other wards, the driving force or the torque from the speed increasing clutch and the speed reducing clutch is directly transferred to the first and the second output shafts without being directly influenced by the rotation or the speed of the internal gear which is so-called as a differential case and is rotated by the driving force from the engine.

Furthermore, since each of the speed increasing clutch and the speed reducing clutch is constituted as a clutch unit, the assembling and maintenance thereafter can be easily performed and the radial size of the carrier case can be limited to a small size due to freedom of selecting the position for assembling.

BRIEF DESCRIPTION OF THE ACCOMPAYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
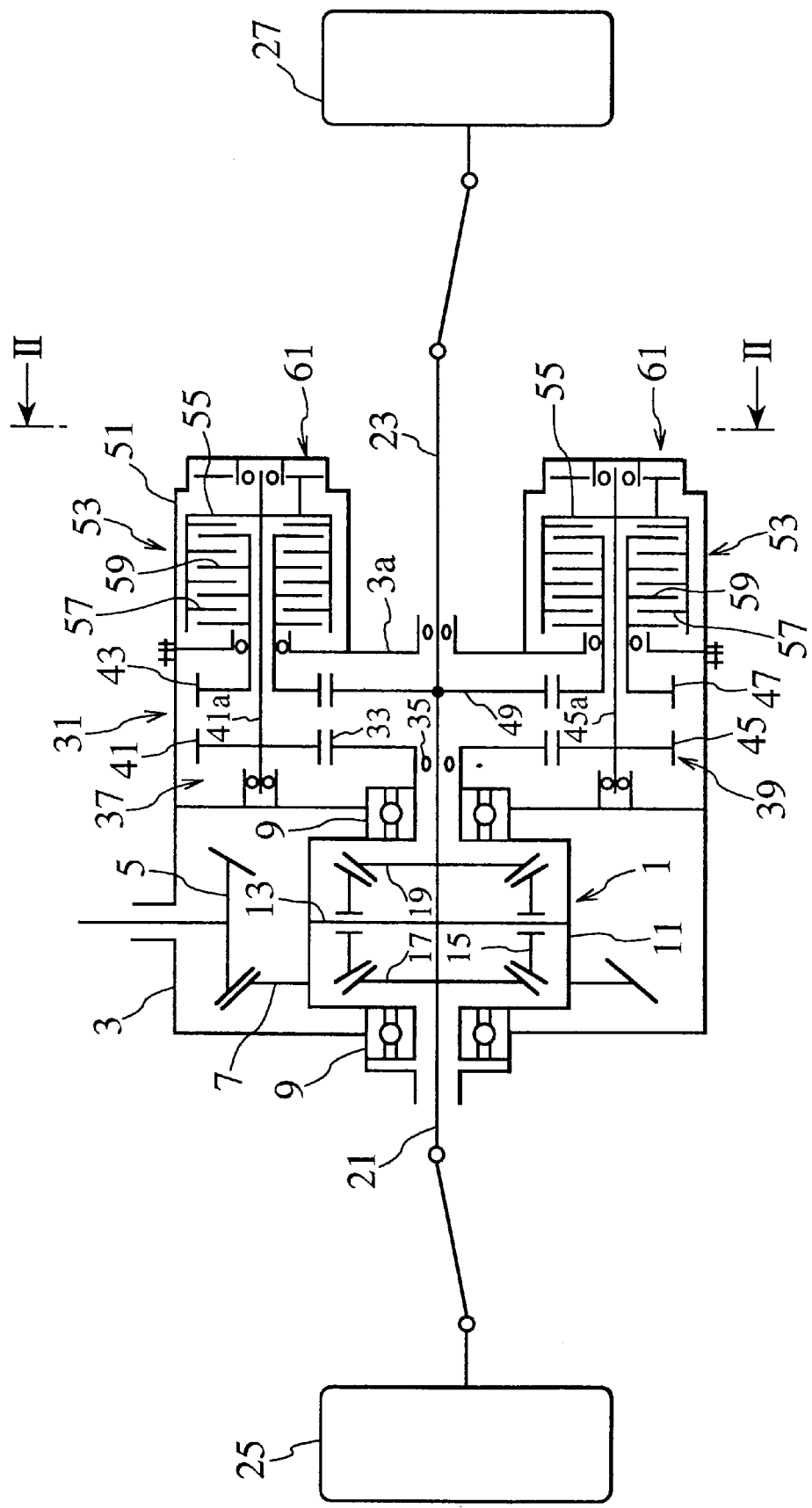
FIG. 1 is a skeleton view showing a schematic structure of a first embodiment according to the present invention.

There will be detailed below the preferred embodiments of the present invention with reference to the accompanying drawings. Like members are designated by like reference characters.

Figure 2:
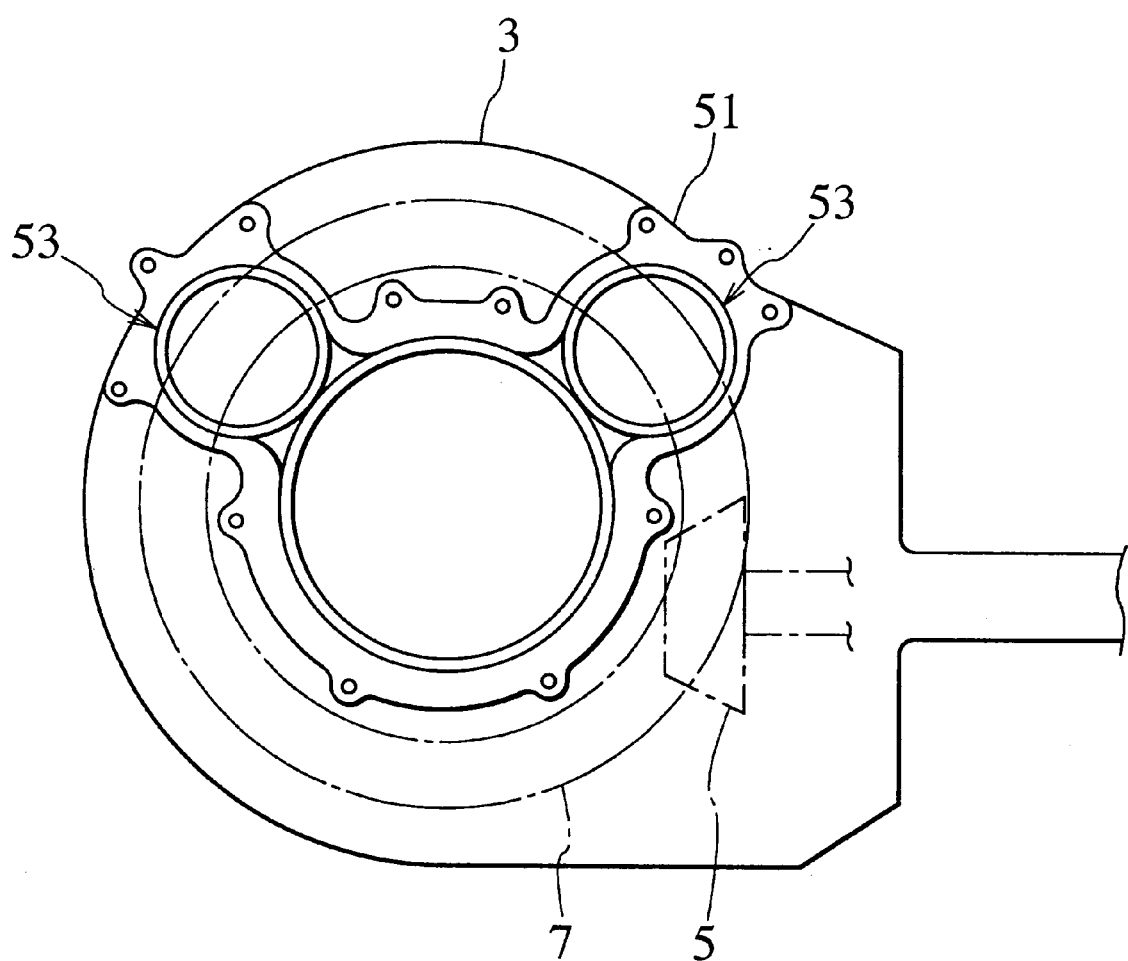
FIG. 2 is a view as seen from a line II—II in FIG. 1.

A first embodiment in accordance with the present invention will be explained below with reference to FIGS. 1 and 2. FIG. 1 is a skeleton view of a differential apparatus in accordance with the present invention and FIG. 2 is a view as seen from a line II—II in FIG. 1.

A drive pinion 5 is rotatably mounted to a carrier case 3 and a driving force of an engine is input to a ring gear 7 meshed with the drive pinion 5. The ring gear 7 is fixed to a differential case 11 as a driving member of a rear differential 1 as a differential gear mechanism corresponding to a bevel gear differential mechanism which is rotatably supported to a left half (one end) of the carrier case 3 via bearings 9.

A pinion shaft 13 is fixed within the differential case 11, a pinion gear 15 is rotatably supported onto the pinion shaft 13 and output end side gears 17 and 19 respectively meshed with the pinion gear 15 are disposed in right and left positions in an opposing manner. A left wheel 25 as a wheel is connected to the left side gear 17 via a left output shaft 21 as a first output shaft, the right side gear 19 is positioned at an end of a speed increasing and reducing mechanism 31 mentioned below and a right output shaft 23 as a second output shaft connected to the side gear 19 extends rightward through an input gear 33 (mentioned below) of the speed increasing and reducing mechanism 31 and connected to a right wheel 27 as a wheel.

Further, the speed increasing and reducing mechanism 31 is housed in the carrier case 3 in such a manner as to be adjacent to the right end of the rear differential 1, and the input gear 33 (in this embodiment, the number of teeth is 30) having a hollow shaft connected to the differential case 11 is rotatably supported onto the right output shaft 23 via a bearing 35. The speed increasing and reducing mechanism 31 comprises a speed increasing mechanism 37 as a speed increasing unit and a speed reducing mechanism 39 as a speed reducing unit, and the mechanisms 37 and 39 respectively comprise input end gears 41 and 45, output end gears 43 and 47. The speed increasing mechanism 37 is connected to a hydraulic multiple disc clutch 53 or the like as a speed increasing clutch, and the speed reducing mechanism 39 is connected to another hydraulic multiple disc clutch 53 as a speed reducing clutch. The input end gears 41 and 45 (in this embodiment, the numbers of teeth are respectively 16 and 17) are meshed with the above input gear 33.

The speed increasing mechanism 37 and the speed reducing mechanism 39 are arranged in a plane crossing or perpendicular to axes of the left and right output shafts 21 and 23 in parallel. Furthermore, the hydraulic multiple disc clutches 53 are also arranged in another plane crossing or perpendicular to the axes of the left and right output shafts 21 and 23 in parallel.

Both of shaft portions 41a and 45a of the respective input end gears 41 and 45 in the speed increasing mechanism 37 and the speed reducing mechanism 39 project rightward from a right end wall 3a of the carrier case 3. Further, the output end gears 43 and 47 (in this embodiment, the numbers of the teeth are respectively 17 and 16) having the hollow shaft portions are disposed in the rightward adjacent to the input end gears 41 and 45 in such a manner as to coaxially rotate to each other. Then, these output end gears 43 and 47 are both meshed with an output gear 49 (in this embodiment, the number of the teeth is 30) fixed to the right output shaft 23. In this case, since each of the input end gears 41 and 45 and each of the output end gears 43 and 47 are formed to change the number of teeth by one tooth by profile shifter gear cutting, a distance between a center of the input gear 33 and a center of the respective input end gears 41 and 45, and a distance between a center of the output gear 49 and a center of the respective output end gears 43 and 47 are set to be equal.

Further, the axial position of the input gear 33 and the respective input end gears 41 and 45 shown in FIG. 1 can be disposed so as to make an axial space of the whole apparatus small by shifting the position toward the rear differential 1 end (leftward in FIG. 1) from the status as shown in FIG. 1.

Further, each of the hydraulic multiple disc clutches 53 and 53 (hereinafter, briefly refer to a clutch) for increasing and reducing speed which is housed in a clutch case 51 and unitized is mounted to the right end wall 31a of the carrier case 3. Clutch drums 55 of the respective clutches 53 are fixed to the shaft portions 41a and 45a of the respective input end gears 41 and 45 of the above speed increasing mechanism 37 and the speed reducing mechanism 39 in such a manner as to rotate in one united body. Each of the clutch drums 55 is alternatively provided with an outer plate 57,locked in the rotational direction and an inner disc 59 locked to the output end gears 43 and 47 in the rotational direction. Further, hydraulic actuators 61 and 61 for connecting and disconnecting the transmission of the driving force of the respective clutches 53 are disposed at the right end. Since the pressing force of the respective hydraulic actuators 61 can be continuously controlled, so that the transmitting torque of the clutch 53 can also be continuously controlled as varying the transmitting torque.

As shown in FIG. 2, the clutch case 51 for housing the respective clutches 53,53 is mounted to the diagonal upper portion of the carrier case 3 so as to form a V-shape disposition. Due to unitizing the respective clutches 53, an automatic transmission fluid (ATF) is used for operating the hydraulic actuator 61 and lubricating the clutch case 51, and a hypoid gear fluid is used for lubricating the speed increasing and reducing mechanism 31 and the rear differential 1.

Next, an operation of the differential apparatus will be explained below.

While the driving force of the engine is input to the differential case 11, the driving force is distributed from the side gears 17 and 19 to the right and left output shafts 21 and 23, the input gear 33 of the speed increasing and reducing mechanism 31 drives the respective input end gears 41 and 45 of the speed increasing mechanism 37 and the speed reducing mechanism 39. In the case that both clutches for increasing speed and for reducing speed are opened, the rear differential 1 always transmits the equal driving force to the right and left output shafts 21 and 23.

When the clutch 53 for increasing speed is coupled by the hydraulic actuator 61 and the clutch 53 for reducing speed is opened, the speed increasing mechanism 37 is going to increase the speed of the right output shaft 23 at a ratio of 17/16. The increasing speed amount by the speed increasing mechanism 37 can be continuously adjusted by controlling the pressing force of the hydraulic actuator 61 (the transmitting torque of the clutch). In correspondence to this, the driving force of the right output shaft 23 is increased and the driving force of the left output shaft 25 is reduced by the corresponding amount.

The driving force distributed to the right and left output shafts 21 and 23 at a time of coupling the clutch 53 for increasing speed is expressed as the following equations:

$$T_R = (T_i/2) + (T_c) - (T_c/2)$$

$$T_L = (T_i/2) - (T_c/2)$$

where, $T_R$ is a distribution torque of the right output shaft 23, $T_L$ is a distribution torque of the left output shaft 21, $T_i$ is an input torque of the rear differential 1 (the ring gear 7) and $T_c$ is a speed increasing torque of the right output shaft 23 (the output gear 49) produced by coupling the speed increasing clutch 53.

When the speed increasing clutch 53 is coupled at a time when the vehicle turns leftward as mentioned above, an under steer state can be prevented since the turning force which tends to turn the vehicle body to the inward direction of the turning (the left inward direction) is increased, thus the turning performance can be improved.

Further, at a time of starting in the case that the left wheel 25 is on the road having a small friction coefficient and being easily slipped, the start of the vehicle can be easily performed by increasing the distribution torque to the right wheel 27 which is hardly slipped as in a manner mentioned above.

Next, when the clutch 53 for reducing speed is coupled by the hydraulic actuator 61 and the clutch 53 for increasing speed is opened, the speed reducing mechanism 39 is going to reduce the speed of the right output shaft 23(right wheel) at a ratio of 17/16. The reducing speed amount by the speed reducing mechanism 39 can be continuously adjusted by controlling the pressing force of the hydraulic actuator 61 (the transmitting torque of the clutch). In correspondence to this, the driving force of the right output shaft 23 is reduced and the driving force of the left output shaft 21 is increased by the corresponding amount.

The driving force distributed to the right and left output shafts 21 and 23 at a time of coupling the clutch 53 for reducing speed is expressed as the following equations:

$$T_R=(T_i/2)-(T_c)+(T_c/2)$$

$$T_L=(T_i/2)+(T_c/2)$$

where, $T_R$ is a distribution torque of the right output shaft 23, $T_L$ is a distribution torque of the left output shaft 21, $T_i$ is an input torque of the rear differential 1 (the ring gear 7) and $T_c$ is a speed reducing torque of the right output shaft 23 (the output gear 49) produced by coupling the speed reducing clutch 53.

The same operation and effect as those in the coupling operation of the clutch 53 for increasing mentioned above can be obtained by coupling the clutch 53 for reducing in correspondence to the turning state of the vehicle and the road condition at a time of starting.

Thus, in accordance with the present invention, the speed increasing and reducing mechanism 31 is constituted by two row disposition comprising each of the input end gears 41 and 45 and each of the output end gears 43 and 47, so that the axial length of the differential apparatus together with the speed increasing and reducing mechanism 31 can be restricted to a small size with being different from the structure of the gear disposition comprising three rows in the above prior art example, and a light weight of the apparatus can be obtained.

Further, since the transmission torque can be continuously adjusted by the hydraulic multiple disc clutch 53, the distribution of the driving force to each of the output shafts 21 and 23 can be continuously and finely adjusted.

Still further, since the respective clutches 53 is constituted to be a unit, assembling the clutch 53 and maintenance thereafter can be easily performed and freedom of selecting the assembling position to the carrier case 3 becomes large. The clutch can be disposed in the diagonal upper portion as in the present embodiment, so that projection from the lower portion of the carrier case 3 toward the road side can be prevented. Accordingly, a risk of colliding against a projecting object on the road surface can be avoided.

Figure 3:
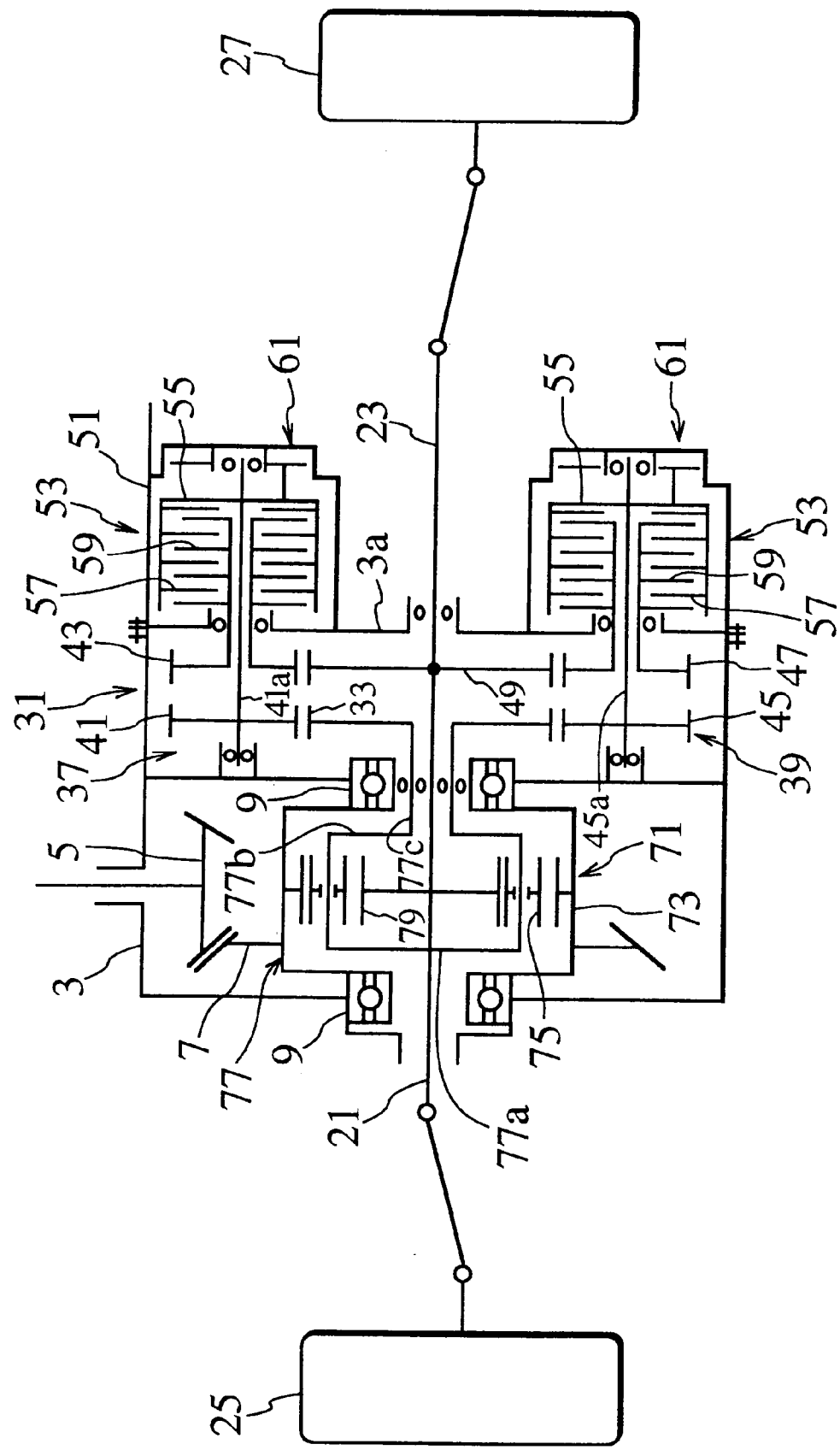
FIG. 3 is a skeleton view showing a schematic structure of a second embodiment according to the present invention.

A second embodiment in accordance with the present invention will be explained below with reference to FIG. 3. FIG. 3 is a skeleton view of a differential apparatus in accordance with this embodiment.

In the differential apparatus is the same structure as those of the first embodiment except a differential gear. Accordingly, the same reference numerals are attached to the elements serving the same function.

An internal gear 73 of a rear differential apparatus 71 corresponding to a planetary gear differential gear mechanism is rotatably supported to the left half (the one end) of the carrier case 3 through the bearings 9. The ring gear 7 is fixed to an outer periphery of the internal gear 73, and is meshed with the drive pinion 5 rotatably supported to the carrier case 3. The driving force of the engine is input to the ring gear 7 via the drive pinion 5.

A pinion carrier 77 as a carrier rotatably supporting a plurality of pinion gears 75 as a planetary gear meshed with the internal gear 73 is coaxially disposed within the internal gear 73, and a sun gear (the other of the output shaft gears) 79 is coaxially disposed therewithin so as to mesh with the pinion gear 75.

Then, a left carrier 77a of the pinion carrier 77 is connected to the left output shaft 21 so that the left wheel 25 is driven. A hollow boss portion 77c of a right carrier 77b in the pinion carrier 77 extends toward the right adjacent speed increasing and reducing mechanism 31. The input gear 33 of the speed increasing and reducing mechanism 31 has the hollow shaft. The input gear 33 is fixed to a front end of the hollow boss portion 77c.

On the other hand, the right output shaft 23 is connected to the sun gear 79, and extends through the axial center portion of the hollow boss portion 77c formed on the right carrier 77b of the pinion carrier 77 so as to project rightward from the right end wall 3a of the carrier case 3, thereby driving the right wheel 27.

In the above structure, in accordance with the present embodiment, the speed increasing and reducing mechanism 31 except the rear differential apparatus 71, the unit of the hydraulic multiple disc clutch 53 and the structure of the hydraulic actuator 61 are the same as those of the above first embodiment, the same operation and effect as those of the first embodiment can be obtained.

The speed increasing clutch and the speed reducing clutch in the present invention are not limited to the structure in the above embodiments, that is, they are disposed adjacent to the speed increasing and reducing mechanism, and may be disposed in the position opposite to each other with respect to the differential gear mechanism.

While preferred embodiments of the present invention have been described using specific terms, such description is for illustrative purposes, and it is to be understood that changes and variations may be made without departing from the spirit or scope of the following claims.

What is claimed is:

1. A differential apparatus comprising:

a carrier case;

a differential gear mechanism rotatably mounted in the carrier case, the differential gear mechanism having a driving member rotatably driven by driving force from an engine, the differential gear mechanism further having a first and a second output shafts distributing the driving force from the engine to wheels;

a speed increasing and reducing mechanism mounted in the carrier case adjacent to the differential gear mechanism, the speed increasing and reducing mechanism having an input gear connected to the driving member, the speed increasing and reducing mechanism further having a speed increasing unit increasing a rotational speed from the input gear and a speed reducing unit reducing the rotational speed from the input gear, the speed increasing unit and the speed reducing unit arranged in a plane crossing axes of the first and second output shafts;

a speed increasing clutch mounted to the carrier case, the speed increasing clutch connecting and disconnecting the rotation from the input gear to the second output shaft, the speed increasing clutch having an actuator intermittently operating the speed increasing clutch; and a speed reducing clutch mounted to the carrier case, the speed reducing clutch connecting and disconnecting the rotation from the input gear to the second output shaft, the speed reducing clutch having an actuator intermittently operating the speed reducing clutch;

wherein the speed increasing clutch and the speed reducing clutch are arranged in a plane crossing the axes of the first and second output shafts.

2. The differential apparatus according to claim 1, wherein the speed increasing clutch and the speed reducing clutch are controllable multiple disk clutches; and the speed increasing clutch and the speed reducing clutch varies and transmits substantially continuously torque from the speed increasing and reducing mechanism to the second output shaft.

3. The differential apparatus according to claim 1, wherein
the speed increasing clutch and the speed reducing clutch are constituted as units being capable of attaching to the carrier case.

4. The differential apparatus according to claim 1, wherein
the second output shaft is disposed to extent through a hollow axial center portion of the input gear of the speed increasing and reducing mechanism.

5. The differential apparatus according to claim 1, wherein
the speed increasing and reducing mechanism further has a transmitting gear connected to the second output shaft;
the speed increasing unit of the speed increasing and reducing mechanism has an input end gear meshing with the input gear and an output end gear meshing with the transmitting gear, the input end gear and the output end gear are formed with different number of teeth from each other by profile shifter gear cutting, a distance between a center of the input gear and a center of the input end gear equals to a distance between a center of the transmitting gear and a center of the output end gear; and
the speed reducing unit of the speed increasing and reducing mechanism has an input end gear meshing with the input gear and an output end gear meshing with the transmitting gear, the input end gear and the output end gear are formed with different number of teeth from each other by profile shifter gear cutting, a distance between a center of the input gear and a center of the input end gear equals to a distance between a center of the transmitting gear and a center of the output end gear.

6. The differential apparatus according to claim 1, wherein
the driving member is a differential case of the differential gear mechanism.

7. The differential apparatus according to claim 1, wherein
the differential gear mechanism is constructed by a planetary gearing.

8. The differential apparatus according to claim 7, wherein
the planetary gearing of the differential gear mechanism is constructed by an internal gear rotated by the driving force from the engine, a sun gear connected to the second output shaft and a planetary gear meshing with the internal gear and the sun gear, the planetary gear is rotatably supported by a carrier; and
the driving member is the carrier connected to the first output shaft.

9. The differential apparatus according to claim 8, wherein
the carrier has a follow boss portion formed to extent toward the second output shaft side in parallel with the second output shaft; and
the carrier is connected to the input gear of the speed increasing and reducing mechanism through the follow boss portion of the carrier.

* * * * *